July 28, 1953  C. A. PARKER  2,646,928
TENS TRANSFER MECHANISM
Filed Aug. 10, 1949  9 Sheets-Sheet 1

INVENTOR.
Charles A. Parker

Eugene E. Stevens
ATTORNEY.

July 28, 1953

C. A. PARKER 2,646,928

TENS TRANSFER MECHANISM

Filed Aug. 10, 1949

INVENTOR.
Charles A. Parker
BY
Eugene E. Stevens
ATTORNEY.

July 28, 1953
C. A. PARKER
2,646,928
TENS TRANSFER MECHANISM
Filed Aug. 10, 1949
9 Sheets-Sheet 4
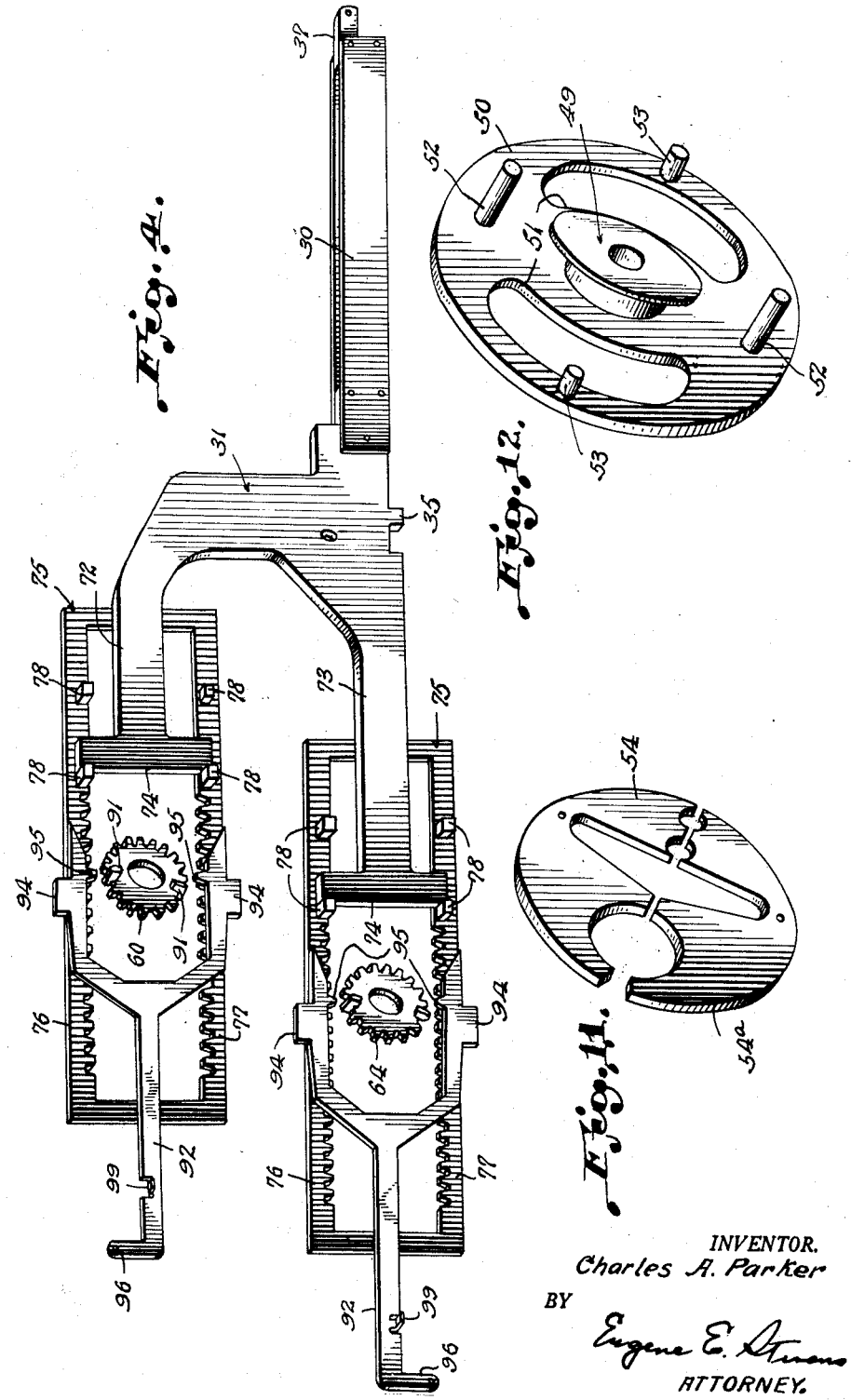
INVENTOR.
Charles A. Parker
BY
Eugene E. Stevens
ATTORNEY.

July 28, 1953
C. A. PARKER
2,646,928
TENS TRANSFER MECHANISM
Filed Aug. 10, 1949
9 Sheets-Sheet 5
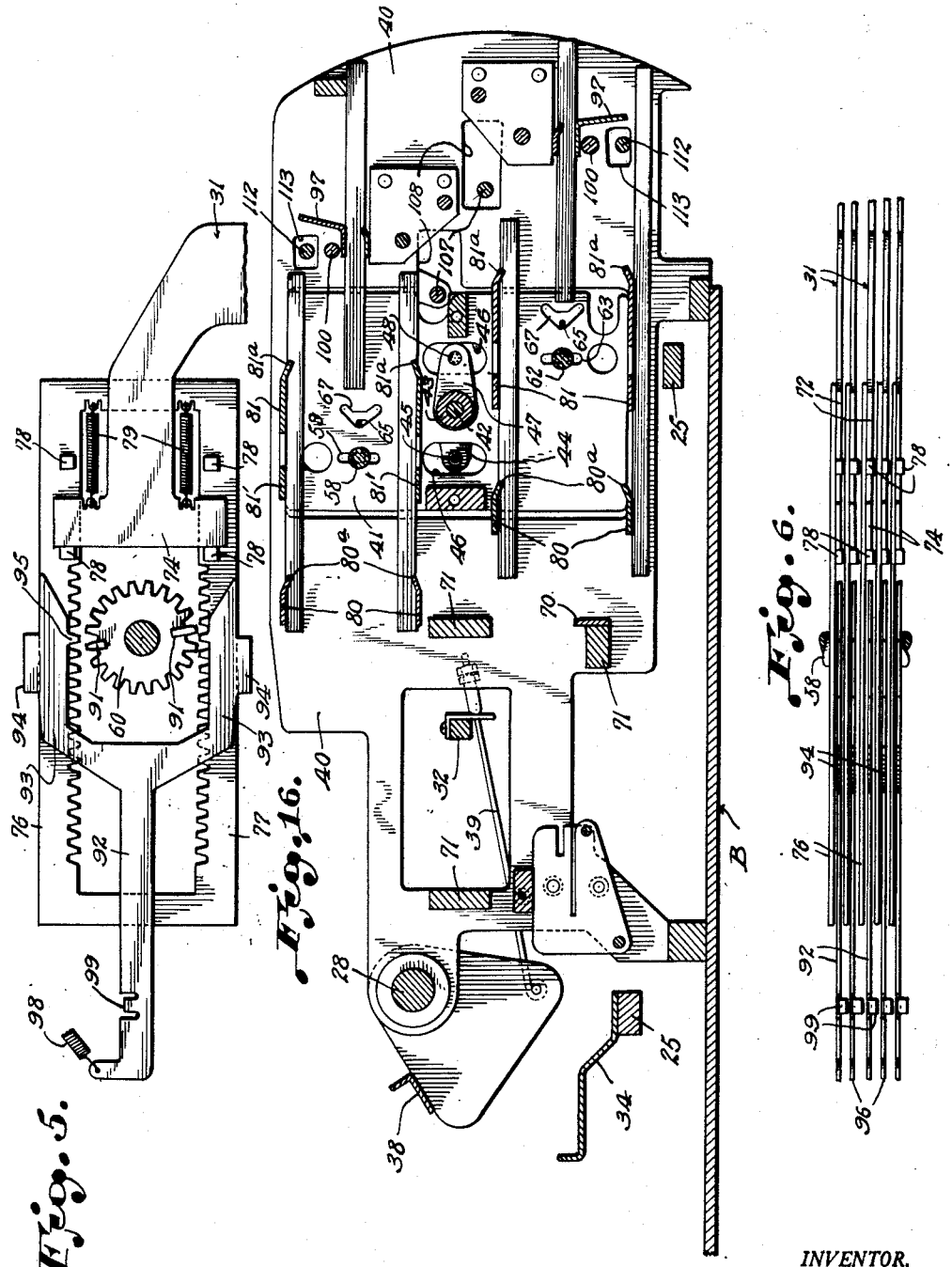
INVENTOR.
Charles A. Parker
BY
Eugene E. Stevens
ATTORNEY.

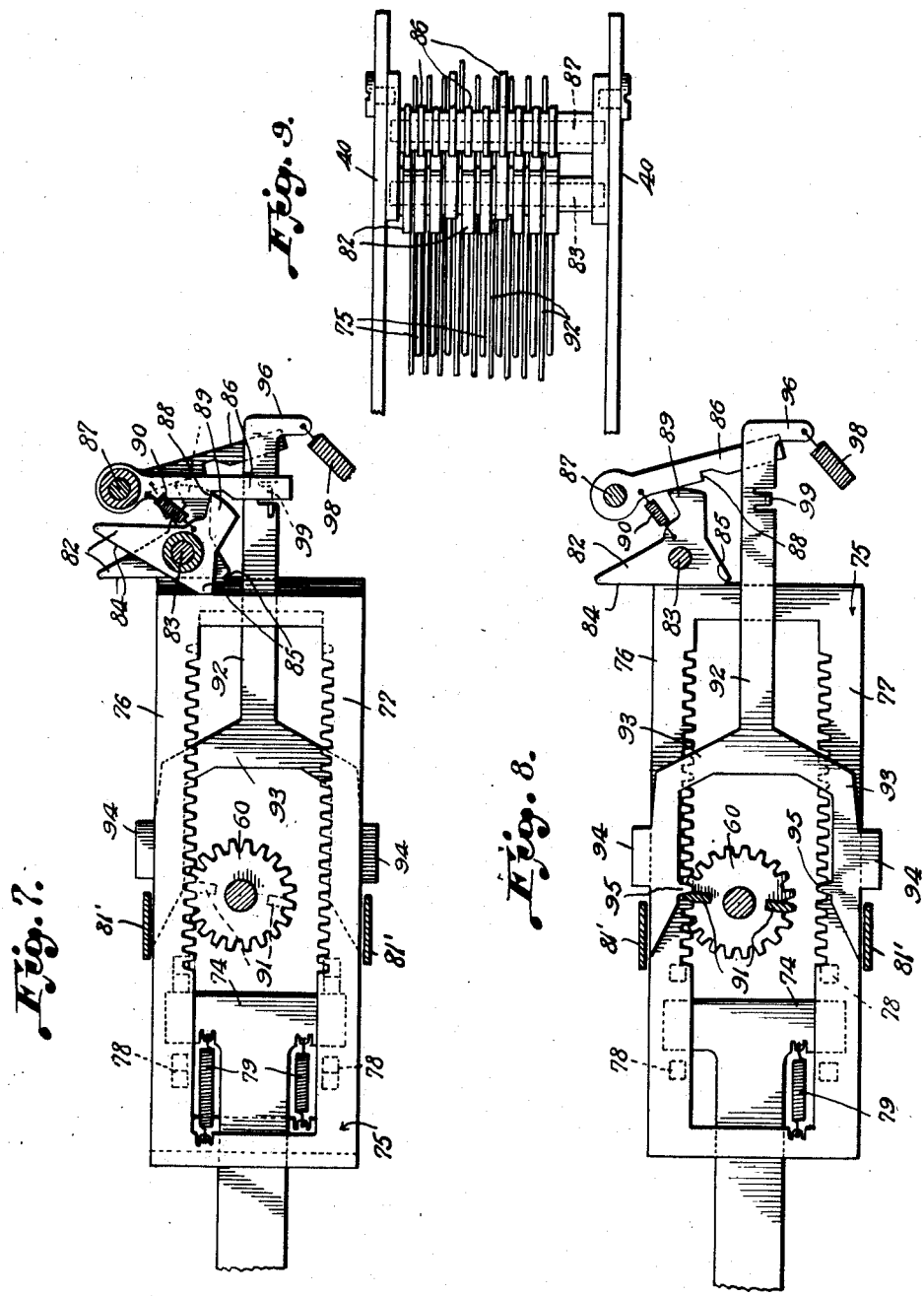

July 28, 1953  C. A. PARKER  2,646,928
TENS TRANSFER MECHANISM
Filed Aug. 10, 1949  9 Sheets-Sheet 7
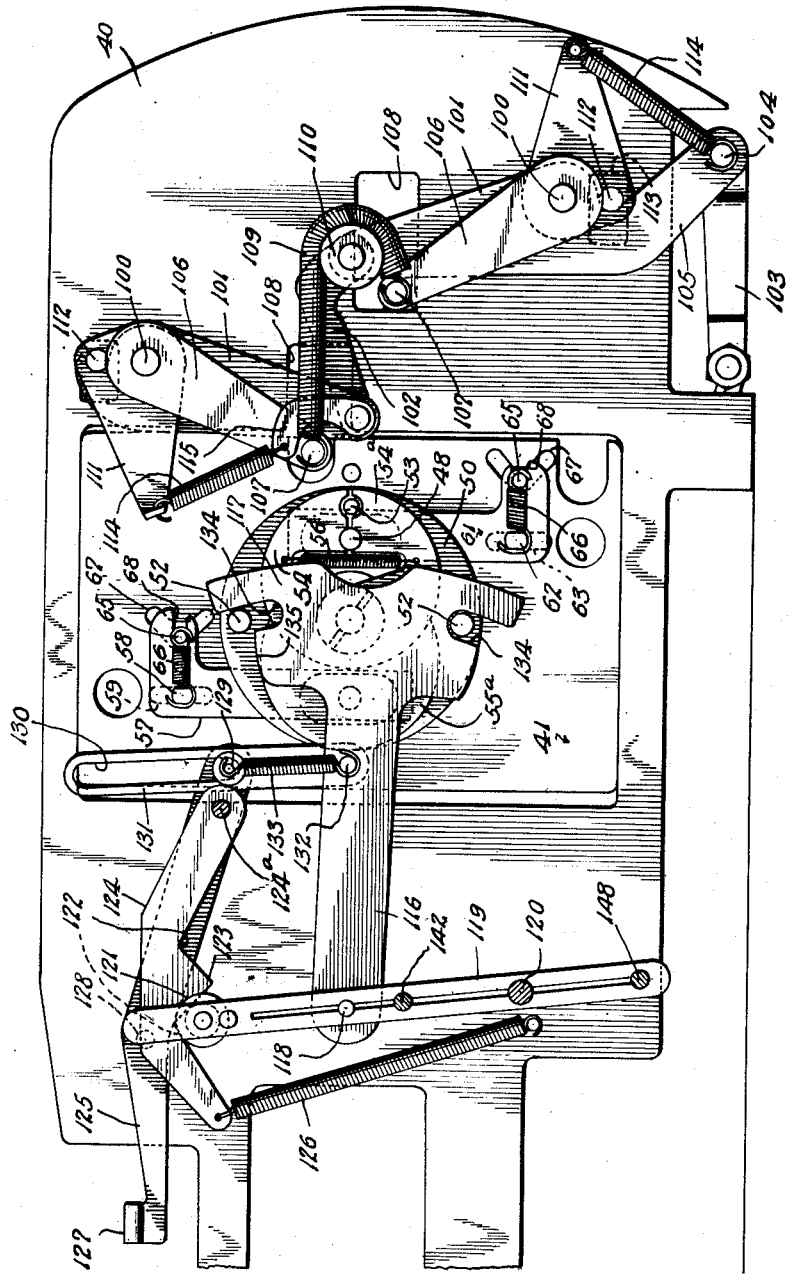
INVENTOR.
Charles A. Parker
BY
Eugene E. Stevens
ATTORNEY.

July 28, 1953 C. A. PARKER 2,646,928
TENS TRANSFER MECHANISM
Filed Aug. 10, 1949 9 Sheets-Sheet 8
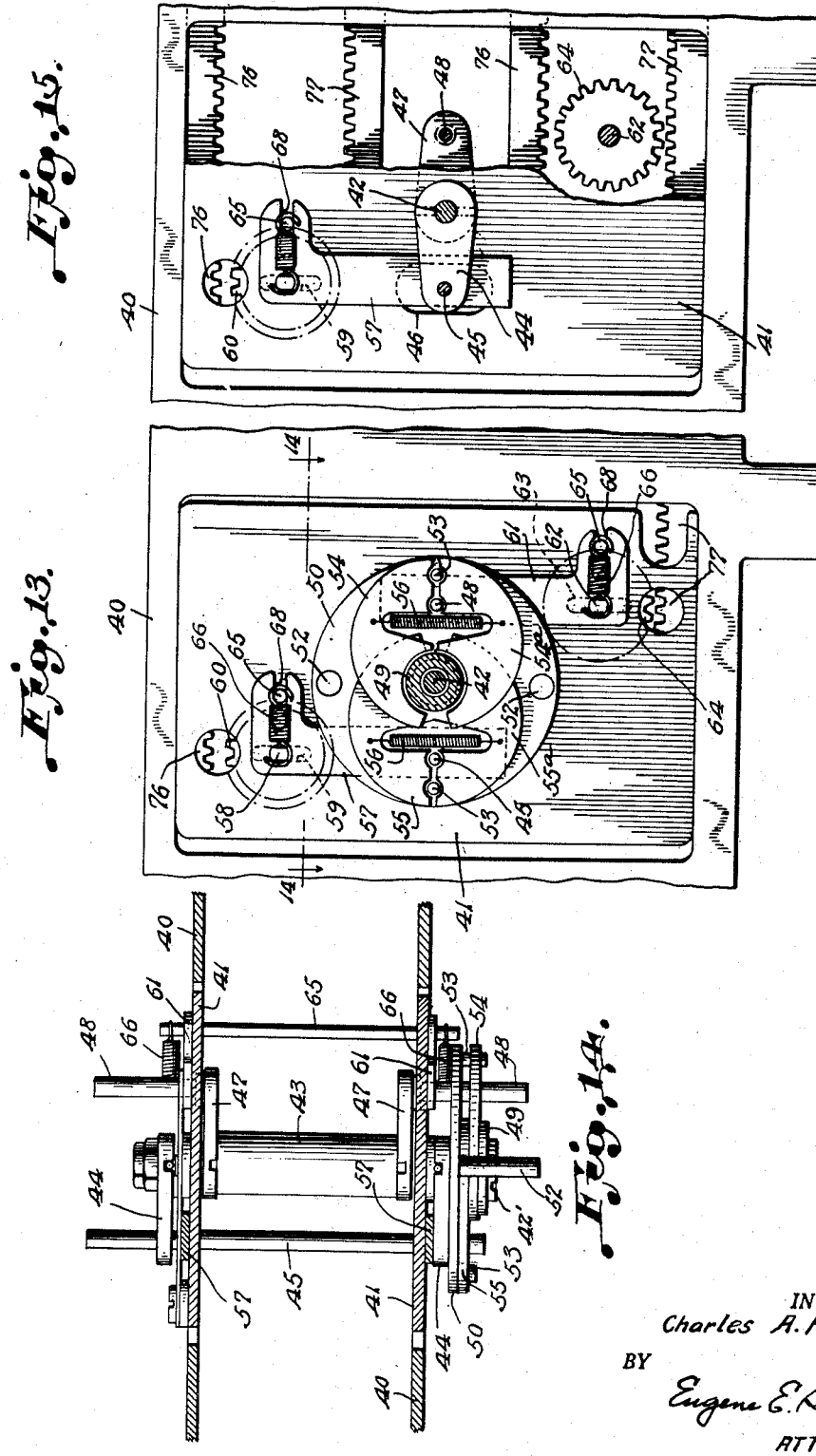
INVENTOR.
Charles A. Parker
BY
Eugene E. Stevens
ATTORNEY.

July 28, 1953  C. A. PARKER  2,646,928
TENS TRANSFER MECHANISM
Filed Aug. 10, 1949  9 Sheets-Sheet 9

INVENTOR.
Charles A. Parker
BY
Eugene E. Stevens
ATTORNEY.

Patented July 28, 1953

2,646,928

UNITED STATES PATENT OFFICE 2,646,928

TENS TRANSFER MECHANISM

Charles A. Parker, Knoxville, Tenn., assignor to Rainey Accounting Machine Company, Inc., Knoxville, Tenn., a corporation of Tennessee Application August 10, 1949, Serial No. 109,570

10 Claims. (Cl. 235—137)

This invention relates to the art of accounting machines of the motor operated type having calculating mechanism under key set control. It is concerned particularly with the register section of such mechanism. Known types of machines incorporate racks movable in mesh with register pinions for additive or subtractive rotation of the pinions depending upon directional shifting thereof when moved into mesh with the racks. A rack is employed for each digit of denominational order, and transfer elements are utilized to effect carries from one denominational order to the next.

An object of the invention is to provide an improved transfer means for effecting carries, wherein the receiving racks are given transfer movement by separate motor means individual to each, the motor means for each rack being made effective by a control element driven from the register pinion of the transferring rack whenever a carry becomes necessary.

Another object is to provide an improved resetting means for the elements of the transfer mechanism.

A further object is to provide dual registers for each denominational order rack, in combination with shifting mechanism for moving the pinions of both registers simultaneously into or out of mesh with their racks, the shifting mechanism having a yieldable characteristic permitting shifting of one register independently of the other and while the other is prevented from shifting, or permitting shifting of both registers simultaneously in the same or in an opposite direction.

Another object is to provide, in a calculating mechanism having actuator slides and corresponding racks, a novel operating connection between each slide and its rack.

Still another object is to provide a tens transfer mechanism including interponents spring biased to a normal position defining the zero stop point for the register pinions.

Other and incidental objects will be apparent to those skilled in the art. It is to be understood that the present disclosure is illustrative and not restrictive, and that the invention may be embodied in any structural organization not inconsistent with its scope as claimed.

In the drawings:

Fig. 4 is a perspective view of an assembly of actuator slide, racks, and register pinions from the side directed toward the assembly next higher in denominational order;

Fig. 5 is an elevation of the upper portion of Fig. 4;

Fig. 6 is a top plan view of the upper register bank of slides and racks;

Fig. 7 is an elevation of the transfer mechanism with a receiving rack positioned additively relative to the transferring rack;

Fig. 8 is a view similar to Fig. 7 but with the transferring rack and part of transferring pinion removed;

Fig. 9 is a top plan view of the transfer mechanism and rack rest assembly;

Fig. 10 is a side elevation of the register shift and the resetting mechanism;

Figs. 11 and 12 are perspective views of elements of the register shift mechanism;

Fig. 13 is an elevation in part section of the register shift mechanism;

Fig. 14 is a horizontal section on the line 14—14 of Fig. 13 with parts removed;

Fig. 15 is a view similar to Fig. 13 but with parts removed for clearness of detail;

Fig. 16 is a section longitudinally through the register section;

Figure 1:
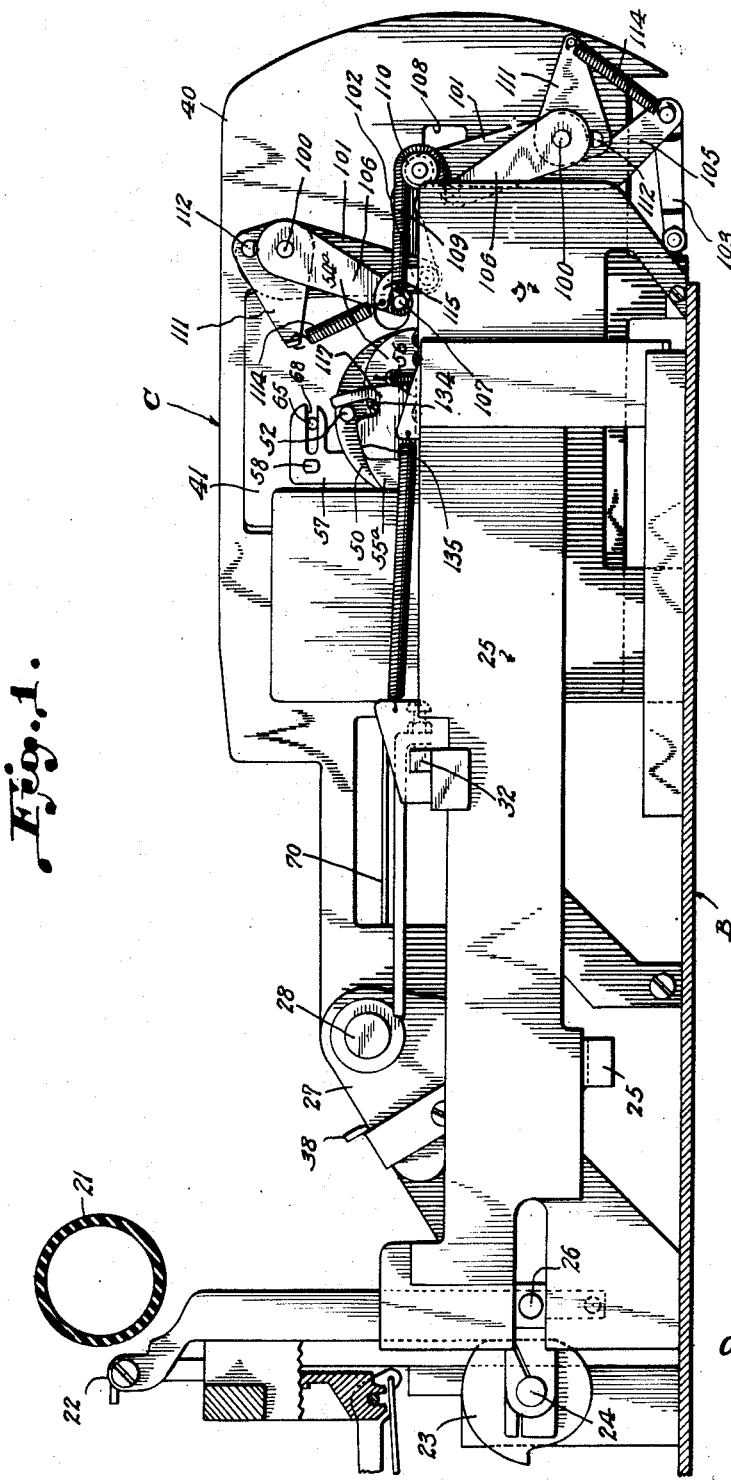
Fig. 1 is substantially a side elevation of a machine incorporating the invention.

As herein disclosed, the invention is shown incorporated in the accounting machine comprising the subject matter of the copending application of Charles A. Parker and Clifton K. Rainey, Serial No. 99,081, filed June 14, 1949. Briefly described, the machine includes a plurality of adding type carriers or bars 20 movable vertically into and from printing position relative to a platen 21. The type bars in printing are struck by a hammer 22 triggered by cam means 23 on a main drive shaft 24 rotatable in the machine frame by motor means, not shown, under the control of an operator. An operating member 25 reciprocates horizontally in the main frame of the machine through one full cycle at each revolution of the drive shaft, there being an operating connection 26 between the shaft and operating member. Each actuation of the motor means effects one complete rotation of the drive shaft and correspondingly moves the operating member 25 through one full cycle between two limit positions in one of which it is at rest. When at rest, the operating member is at its rearmost limit of travel, as in Fig. 1.

Each type bar is moved to and from printing position by an individual bell crank lever 27 pivoted at 28 to oscillate in a vertical plane common to the type bar. The long arm of the lever is in operating connection with the lower end of the type bar and, in normal position with the type bar fully lowered out of printing position, the short arm of the lever is held by a latch 29 so that the lever cannot rock to lift the type bar. The latch is biased to engaged position and is releasable by the camming action of an extension 30 on an actuator slide 31 of the calculating unit C. A slide 31 is paired with each type bar and reciprocates horizontally in the vertical plane common to its associated type bar and bell crank lever. A restore bar 32 extends transversely across the leading edge portions of the slides and restrains them against forward movement towards the type bars under the urge of a contractile spring 33. One such spring is connected between the short arm of each bell crank lever 27 and a fixed element 34 of the operating member 25.

Each slide 31 has an abutment 35 that is engageable by key set stop pins, not shown, which determine the extent of forward travel of the slides. When the operating member 25 is cycled, those slides permitted movement beyond zero position travel forward under the pull of a contractile spring 36; one such spring being connected between the front end of each slide extension 30 and the operating member element 34. The restore bar will have been moved ahead of the slides under propulsion of the operating element by the time those slides free to move beyond zero position begin their travel past that point. In the course of their forward travel their associated latches 29 are disengaged, whereupon the released bell crank levers 27 rock under the pull of their springs 33 to lift their corresponding type bars into printing position. The terminal portion of the short arm of each released bell crank lever engages behind an abutment 37 on the slide extension 30, so that the printing elevation of the type bar is determined by the point at which further forward travel of the slide is arrested.

As the conclusion of a printing operation the operating member 25 moves rearwardly through the second half of its cycle back to its initial position of rest. During this movement the restore bar is retracted and carries back with it all advanced slides. The retracting slide extensions rock their associated bell crank levers and pull the type bars down out of printing position. When the slides come to rest at the end of their rearward travel a further rocking movement is given the bell crank levers to carry their short arm terminals rearwardly away from the slide extension abutments 37 for reengagement by the latches 29. This further movement is effected by a pull-down yoke 38 that straddles the long arms of the entire set of bell crank levers in an operating connection 39 with the restore bar.

The instrumentalities and the arrangement of parts thus far described in detail are those of the aforesaid Parker and Rainey application Serial No. 99,081, filed June 14, 1949, and are not a part of this invention except as they enter into the general combination. The present invention deals particularly with the register section of the calculating unit C.

*The register*

The register section is contained within the calculating unit frame. This frame comprises parallel side walls 40 having appropriate transverse connection and mounted on the bottom plate B of the main frame of the machine to extend longitudinally therein in rear of the platen and the type bar assembly. Each side wall 40 (see Figs. 13, 14, 15 and 16) is provided with a vertically elongated rectangular aperture in which a rectangular plate 41 of lesser width than the aperture is disposed for limited horizontal shifting movement for adjustment, bearing on the bottom edge of the aperture. These plates journal between their centers a transverse concentric shaft assembly comprising an inner shaft 42 and an outer sleeve shaft 43 rotatable thereon. Cranks 44 fixedly secured on the inner shaft 42 exteriorly of the plates 41 support between them a transverse rod 45 which plays in a vertical slot 46 in each plate in accordance with the throw of the cranks on rotation of the inner shaft. In like manner the outer shaft 43 has similar cranks 47 fixedly secured thereto interiorly of the plates 41. These cranks are provided at their outer ends with lateral outwardly directed pins 48 which extend through the plates 41 in another pair of the clearance slots 46. The cranks 44 and 47 are oppositely directed and are spaced 180 degrees apart.

Shaft 42 extends outwardly beyond the plates 41. One end of the inner shaft 42 journals an annular shouldered sleeve 49 spaced axially from the adjacent crank 44 and which is secured to an inner disc 50 and provides a bearing for portions of two smaller split discs. The sleeve is free to turn on the shaft between the crank 44 and a retaining nut 42' in the end of the shaft. The large disc 50, best shown in Fig. 12, is formed with a pair of diametrically opposed arcuate slots 51 through which extend, respectively, the adjacent end of the rod 45 and the adjacent pin 48, in ample clearance. The disc 50 is further provided with a pair of outwardly directed lateral studs 52 in diametric opposition, and with a second pair of similar but shorter studs 53 diametrically opposed and spaced 90 degrees relative to the studs 52, and radially outward of the slots 51.

Each split disc, see Fig. 11, comprises two identical semicircular sections. The one at the right relative to Figs. 13 and 14 consists of sections 54 and 54a, and that at the left has sections 55 and 55a. The sections of each disc are in coplanar relation and are provided at their opposed edges with rounded bearing recesses adapted to seat over the shouldered sleeve 49 and over the disc studs 53, the rod 45, and pin 48. The sections are further formed with an aperture suitable to house a contractile spring 56 secured to the sections in a manner biasing their opposed edges into meeting engagement. The opposed edges are angled in diverging relation between the peripheral edge of each section and its large recess, so that when the split discs are assembled their sections are capable of a relative rocking movement. As shown in Fig. 13, the split discs are disposed in overlapped relation and eccentric with respect to the assembly of the shafts 42 and 43. Their springs 56 urge the opposed edges of the sections in clamping engagement over the sleeve 49, end of rod 45, pin 48, and studs 53.

The rod 45 extends through and pivotally supports the lower ends of a pair of inverted L-shaped links 57 that are vertically slidable on the outer faces of the insert plates 41. These links support between their upper ends a transverse register pinion shaft 58 which plays in and through a vertical guide slot 59 in each plate. A set of register pinions 60, one for each numerical order, is freely rotatable on the shaft 58 between the plates 41. In like manner, the pins 48 of the sleeve shaft cranks 47 extend through and pivotally support the upper ends of a pair of depending L-shaped links 61 that are vertically slidable on the outer faces of the plates 41. The depending links support between their lower ends a transverse register shaft 62 which plays in and through a vertical guide slot 63 in each insert plate. A second and similar set of register pinions 64 is freely rotatable on the shaft 62, each being in vertical coplanar alignment with its corresponding pinion in the upper set. When the register pinions are in neutral position they are latched against rotation by means of a bar 65 meshed with the pinion teeth under the pull of contractile springs 66. The latch bar for each set of pinions extends between the plates 41 and projects at each end through a triangular aperture 67 in the plate, with the end of the bar slidably supported in a horizontal slot 68 in the foot of the adjacent link 57 or 61. Reciprocation of the links correspondingly moves the latch bars, which then are cammed by the sloping sides of the apertures 67 and shifted laterally against the pull of the springs 66 to disengage the register pinions.

A driving connection later described between the disc 50 and the operating member 25 effects an oscillation of the shaft assembly 42—43 to shift the register pinions into operative engagement with racks of the calculating actuator slides just before the slides start to move back from their forward limit positions following a printing operation, whereby the amount of the item is added or subtracted in the register in accordance with the setting of the machine controls for effecting the direction of oscillation.

Figure 2:
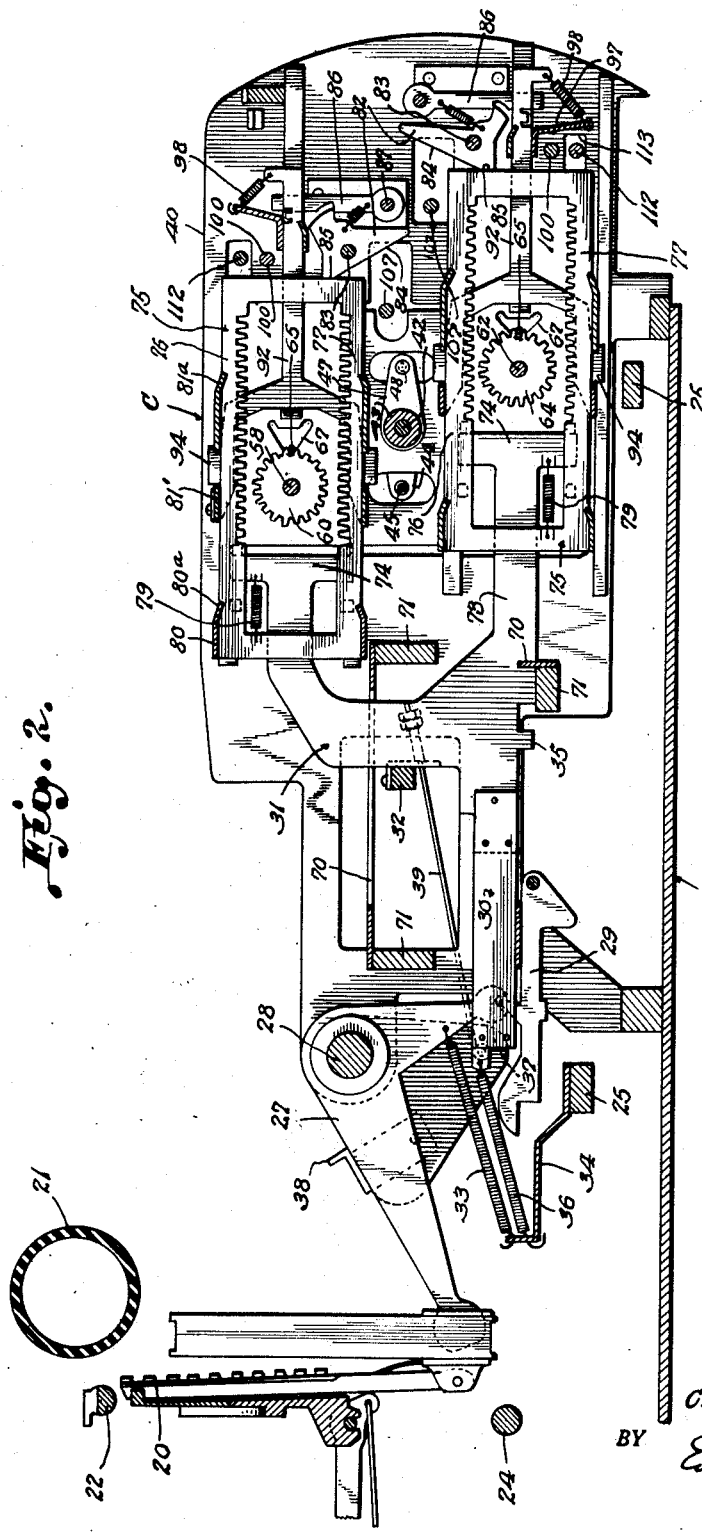
Fig. 2 is longitudinal section through Fig. 1 with the register pinions in neutral position out of mesh with their racks, and with the racks at their rearmost limit of non-transfer movement.

The register actuating slides 31 are arranged in parallel relation for horizontal reciprocation in a guide comb 70 mounted on transverse supports 71 in the calculating unit frame. Each slide is rearwardly bifurcated to provide an upper register stem 72 and a longer lower register stem 73 in parallel coplanar vertical alignment. Each stem terminates in a T-head 74 disposed at one side of a rectangular box rack 75 having a top rack bar 76 and a bottom rack bar 77 toothed to mesh with the adjacent register pinion that is disposed between the two. With reference to Fig. 4, it will be seen that the stem head plays between a pair of longitudinally spaced lugs 78 on the front end portion of both rack bars. These lugs are directed laterally from that side of the rack which faces the rack of the next higher denominational order. A contractile spring 79 connected between a flange of the T-head and the front end of the rack normally biases the rack to the position shown in Fig. 3, with the front lugs 78 abutting the flanges of the T-head. It has proved practical to employ a single spring, with the springs of alternate racks staggered as in Figs. 7 and 8, but if desired a pair may be used for each rack, as in Fig. 5. The racks are supported and guided by comb plates 80 extending transversely between the frame sides 40 at the front end of the racks, and by comb plates 81 of greater width similarly mounted rearwardly of the plates 80 and spaced therefrom. The comb plates are provided with rearwardly directed vertically convergent fingers 80a and 81a, respectively, which engage the sides of the racks to maintain them in properly spaced and vertical position. When the racks are fully retracted, as shown in Fig. 2, their vertical rear ends abut individual rack rests 82, in which position the springs 79 are under tension urging the racks to further rearward movement.

The rack rests of both register sets, see Figs. 7, 8 and 9, comprise thin planar rockers pivoted freely on a fulcrum shaft 83 common thereto which extends transversely between supports secured on the calculating unit side walls 40. The rack engaging edge of each rocker has a relatively long straight edge face portion 84 and a short straight edge face portion 85 at an obtuse angle rearwardly from the portion 84. Both portions are tangential to the arc of swing of the rocker. Normally, with the racks at rest in rearmost position under conditions of no transfer in the register, the rockers are disposed with their short edges 85 engaged by the racks. The rockers of the respective register sets are relatively reversed, with the fulcrum shaft 83 in the upper register horizontally aligned with the bottom rack bars 77, and with the fulcrum shaft in the lower register horizontally aligned with the top rack bars 76. In each case the short edges 85 of the rockers are horizontally offset relative to the fulcrum point, so that pressure of the engaged racks under the rearward urge of the tensioned springs 79 constantly biases the rockers to pivot in a direction to bring their long edges 84 to rack holding position. The rests 82 normally are held against such pivotal movement by a latch lever 86 individual to each rocker directly in rear thereof. The latch levers in each register set have one end freely pivoted on a fulcrum shaft 87 common thereto and extending transversely between the supports which mount the rocker shaft. A recess in the forward edge of each lever provides a shoulder 88 that engages over a nose 89 on the adjacent rocker when the latch lever is disposed vertically in parallel relation to the rear end of the associated rack. The end of the nose 89 is rounded off to provide ample clearance in the latch lever recess, and the latch shoulder 88 is so located that when it is engaged over the nose of the rocker the nose is held in the same horizontally offset relation to the rocker fulcrum point as the short edge 85 of the rocker. Due to this arrangement, the pivotal bias of the rocker is transmitted through its nose portion as a vertical longitudinal thrust against the latch shoulder 88, so that the latch is held forcibly engaged also under the urge of the springs 79 when the rack contacts the rest. A relatively weak contractile spring 90 connected between the rocker and the latch lever near its fulcrum point maintains the lever in contact with the rounded edge of the rocker nose when the latch is disengaged and serves also to bias the nose of the rocker for movement out of a position in which it can engage the latch lever shoulder 88.

*Transfer mechanism*

In the present embodiment of the invention each register pinion has twenty teeth representing two series of digits 0–9. In both the upper and lower sets each pinion is provided on its side face adjacent the next higher order pinion with a pair of diametrically opposed lugs 91, each of which is a lateral enlargement of a tooth at the zero position. These lugs function in cooperation with interponents 92 in effecting a transfer or "carry" from each rack to that next in order. Each rack is paired with an interponent located alongside the rack face adjacent the next higher denominational order rack. The interponent body has a horizontally disposed shank bifurcated at its front end to provide parallel arms 93 contiguous to the top and bottom bars of the rack. These arms are supported and guided for horizontal reciprocation in the rear comb 81 in the same manner as the racks. Stop lugs 94 on the arms play in the slots of the comb and are engageable against a stop plate 81' in front of the slots to determine the forward limit position of the interponent. Each arm has an integral single tooth 95 adapted to coincide with a tooth of the adjacent rack bar and to be engaged by one of the lugs 91 of the register pinion of its paired rack to effect a bodily shift of the interponent rearwardly when the pinion is rotated additively beyond the ninth digit, thereby necessitating a transfer, and to stop the pinion at zero point when the interponent is in forward stop position and the pinion is reversely rotated.

As best shown in Figs. 7 and 8, a transfer is made by effecting a one digit further movement of the next higher order rack beyond the point at which the transferring rack comes to rest. The shank of each interponent 92 extends rearwardly in the median plane of its rack beyond the area of movement of the latch levers and is provided with a vertically directed terminal 96. The shanks are guided in and supported by comb elements 97 generally similar to the combs 80 and 81. A contractile spring 98 between each shank terminal 96 and a point on its guide comb urges the interponents forwardly to abut their stops 94 against the stop plates 81'. The rear end portion of each shank carries an ear 99 directed laterally toward and in front of the latch lever of the next higher order rack assembly, with the ear contacting the edge of the latch lever when the lever is in latch-engaged position and the interponent is at its forward limit position. When a lug 91 on the register pinion driven from a rack from which a transfer is to be made engages the transfer tooth 95 of its interponent, it cams the interponent bodily rearward the distance of one rack tooth. If the register pinion is rotated further it clears the interponent tooth 95, whereupon the interponent immediately snaps back to its zero position against the stop plate 81'. Thus, the interponent is restored to zero position independently of any movement of either the racks or the rack rests, and before the transfer receiving rack moves fully into its receiving position; thereby conditioning this portion of the transfer device for further transfer or for total taking operation. At the same instant the ear 99 on the interponent shank trips the engaged latch lever rearwardly to free the nose 89 on the rocker holding the next higher order rack, whereupon the rocker pivots as previously described to swing its short edge 85 rearwardly and permit its rack to shift rearwardly until arrested by the long edge 84, a distance of one rack tooth beyond that of the transferring rack. Thus a transfer of one digit is added in the register of next higher order.

An important feature of the invention is the rapidity with which transfer is effected. One can be made across the entire set of racks in a very small fraction of a second. This is possible because of the fact that when the racks come to rest against the short edges of their rockers, each is under spring tension urging further rearward movement, which occurs simultaneously with pivotal swing of its rocker. As each rack begins its further one tooth rearward movement, its register pinion shifts its interponent to release the latch of the next higher order rocker to swing and thereby simultaneously to allow a further one tooth rearward movement of its own rack, whereupon the process is successively repeated in the ascending order racks. Each rack moves the additive step under the force of its own spring 79 and motivates the latch release for movement of the next order rack under the fresh force of its own spring bias. The racks are independently propelled by the force of individual springs of equal strength.

Reset mechanism

When the operating member 25 is cycled the register pinions are shifted to neutral disengaged position intermediate the rack bars at the beginning of the cycle and then resetting means is motivated to restore and relatch all rack rest rockers pivoted out of initial position in effecting transfers. The reset mechanism includes a fulcrum shaft 100 supported in and transversely between the side walls 40 of the calculating unit frame in both registers. The opposite ends of these shafts project outwardly through the walls 40. A vertically disposed lever 101 is pivoted intermediate its ends on each projecting end of the fulcrum shafts outwardly of the side walls. In conformity with the offset relation of the upper and lower registers, the levers 101 are correspondingly offset and are connected at their inner ends by a link 102 for movement in unison. Oscillation of the levers 101 is effected from the operating member 25 by means of a throw link 103 pivotally connected at one end to the operating member and at its other end to a cross bar 104 connected transversely between the outer end portions 105 of the levers 101 in the lower register. A second lever 106 is pivoted at its outer end on the fulcrum shaft 100 for oscillation alongside each lever 101. These levers 106 are inclined forwardly with respect to the levers 101, and each pair supports between its inner ends a transverse reset bar 107 which plays freely through clearance apertures 108 in the walls 40 forwardly of the rack rest rockers 82. A coiled contractile spring 109 is trained over a sheave 110 on the inner end of each lever 101 of the lower register and yieldingly connects the inner ends of the levers 106 and shafts 107 for movement in unison. When the levers 101 are rocked by pull of the link 103 as the operating member moves forwardly, the sheave 110 pulls the spring 109 rearwardly and correspondingly rocks the levers 106 to move the reset bars 107 against the outer front ends of the rockers 82 and return them to initial latched position.

Rack reset means is provided for operation in conjunction with the rocker reset mechanism. The rack reset in each register includes a third lever 111 also pivoted on the fulcrum shaft 100 alongside each lever 106 to oscillate in a vertical plane. The levers 111 mount between each pair a transverse reset bar 112 which plays freely through clearance apertures 113 in the walls 40 in rear of the racks. When the actuator levers 101 are rocked, the levers 111 are correspondingly pivoted through the pull of a contractile spring 114 connected between one end of each lever 111 and the cross bar 104 in the lower register set, and between one end of each lever 111 and the free end of an auxiliary link 115 in the upper register set. The other end of each link 115 is pivotally connected to the forward end of the link 102. By means of the linkage just described the rack reset bars 112 engage the rear ends of those racks moved additively beyond the others and restore them to initial alignment with the others. Further forward propulsion of the racks is prevented by engagement of the bars 112 against the forward ends of their clearance apertures 113, which ends are vertically aligned with the short edges 85 of the rests 82 when in initial non-transfer position.

Resetting of the racks is expedited by the camming action of the rockers 82 against the rear ends of the racks as the rockers are swung by their own reset bars 107. Furthermore, when the rockers begin resetting movement, their nose portions 89 move away from the latch levers which already are spring biased to move into engaged position; so that when the rockers come to rest the latch levers continue to move until their shoulders 88 are fully latched over the noses of the rockers.

Register shift

Figure 3:
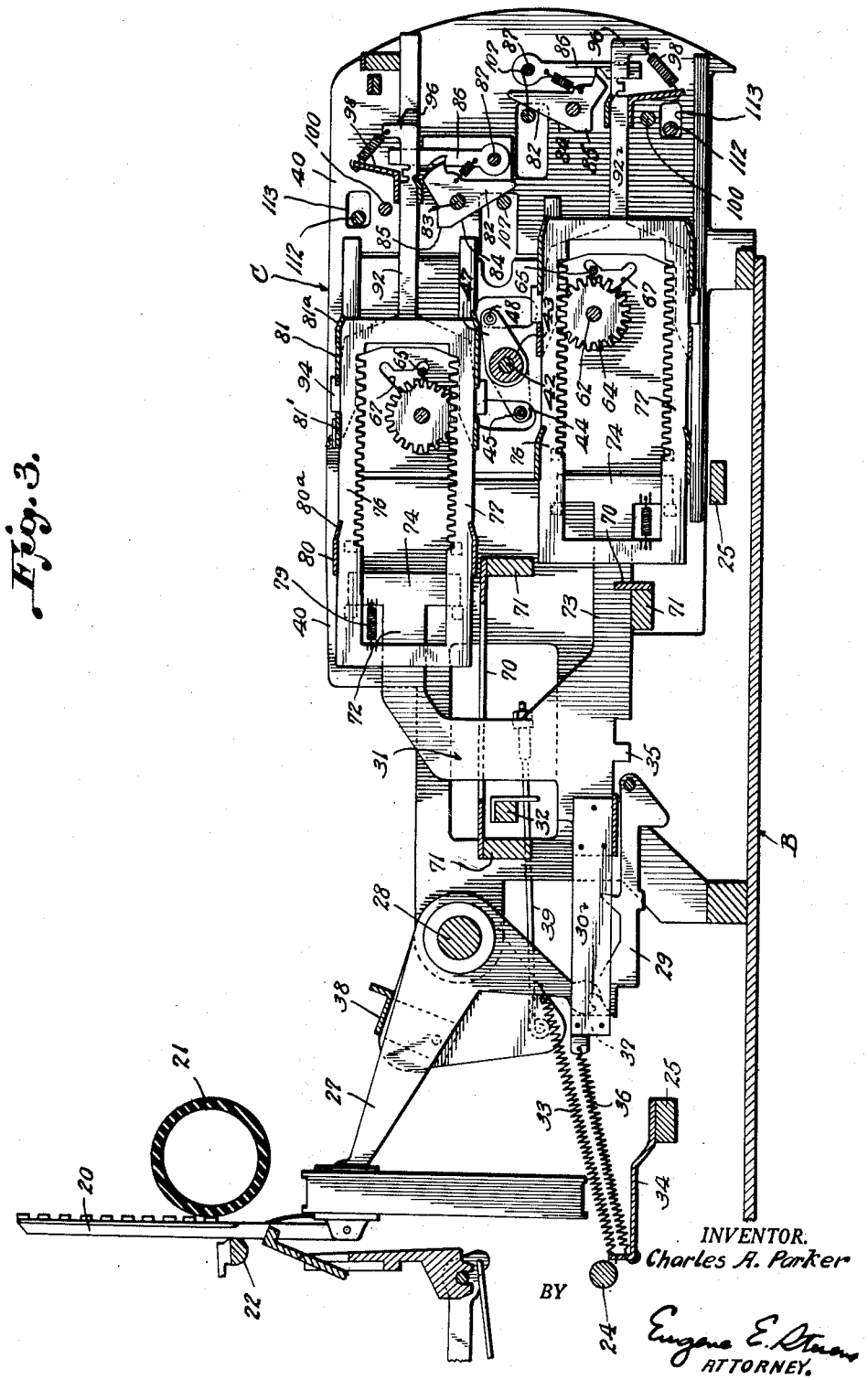
Fig. 3 is a section similar to Fig. 2 with the racks at their forward limit of travel and meshed with the register pinions.

In this embodiment of the invention the addition side of the racks is in the top bars of the lower racks and the bottom bars of the upper racks; so that when the register pinions are shifted into rack engagement, as in Fig. 3, both registers are employed for simultaneous addition. When the slides 31 move forward for indexing and printing, both the upper and the lower sets of register pinions are in neutral disengaged position. At the initiation of rearward movement of the operating member 25 in the second half of its cycle, a connection from the operating member operates to rock the cranks 47, shaft 43, and the pins 48 to lift the links 61 and thereby carry the set of lower register pinions 64 into mesh with the top bars of their racks. At the same time, the links 57 are lowered to carry the set of upper register pinions 60 down into mesh with the bottom bars of their racks. The driving connection from the operating member 25 includes a horizontally disposed lever 116 having a rearwardly directed arcuate T-head 117 located alongside and outwardly of the assembly of split discs and the larger disc 50. This lever 116 is of thin planar structure and is pivoted at its forward end to oscillate in a vertical plane on a fulcrum member 118 carried on a vertical rocker post 119. The rocker post is pivoted between its ends on a fulcrum 120 carried by a support element S secured on the base of the machine. At its upper end the post mounts a roller 121 that is engageable in valleys 122 at the sides of a ridge 123 upon the bottom edge of a detent lever 124 which is pivoted at one end as at 124a to the support element S secured to the base of the machine. The detent is biased downwardly in engagement with the roller 121 by a contractile spring 126 connected between the free end of the detent and a point of attachment on the support S, whereby the post is held yieldingly in either of two positions determined by the valleys 122.

In the position of the parts as shown in Fig. 10 the register pinions are in neutral disengaged position. When the operating member 25 moves rearwardly its connection with the rocker post 119 rocks the post rearwardly and correspondingly shifts the lever 116. The head 117 seats on the lower of the pair of studs 52 on the large disc 50, with the stud housed at the inner end of an arcuate keeper slot 134 in the lower arm of the head 117. The upper stud 52 is adapted to play in a similar slot 134 in the upper arm of the head when the lever 116 is rocked upwardly. In the normal position of the lever, the upper disc stud is free of its keeper slot and is in position to ride over a lateral reduction 135 of the head when the disc is rotated counterclockwise with respect to Fig. 10. Rearward shift of the lever 116 drives the lower stud 52 to rock the disc 50 in a counterclockwise direction relative to Fig. 10. This rocking movement correspondingly elevates the rear stud 53 of the disc 50 and simultaneously correspondingly lowers the forward stud 53 of the disc. As the rear stud 53 moves up it lifts the split disc section 54 and this section in turn, acting through its spring 56, pulls up the lower section 54a and correspondingly elevates the pins 48 so that the links 61 are lifted to shift the lower register pinions into engagement with the top bars of their racks. In like manner, but in reverse movement, the forward stud 53 in moving down depresses the split disc section 55a and this in turn, acting through its spring 56, pulls down the upper section 55 and correspondingly depresses the rod 45 to lower the links 57 whereby the upper register pinions 60 are carried down into mesh with the bottom bars of their racks. When the operating member 25 is again cycled, its forward movement is transmitted through the driving connection, later described, to rock the post 119 forwardly and correspondingly to shift the lever 116 forwardly. In so moving, the lever, acting through the head 117, drives the lower stud 52 in a clockwise direction. This movement of the stud correspondingly rocks the disc 50 so that its rearward stud 53 is carried down to depress the lower split disc section 54a. This section, acting through its spring 56, correspondingly pulls down the upper section 54 which, in turn, carries down the pin 48 and thereby lowers the links 61 to move the lower register pinions out of engagement with their racks and back to neutral position. In like manner, but in reverse movement, clockwise rotation of the disc 50 elevates its forward stud 53 to raise the split disc section 55 and exert a pull on the spring 56. This pull elevates the lower disc section 55a and correspondingly elevates the rod 45 to lift the links 57 and carry the set of upper register pinions out of engagement with the lower bars of their racks and into neutral position.

When the calculating unit is to be conditioned for a subtract operation, a control lever 125 is manipulated. This lever is adapted for manual as well as automatic actuation from its forward end terminal 127. The lever is pivoted intermediate its ends as at 128 to a support and is adapted to rock in a vertical plane. The rear end of the lever carries a lateral stud 129 which rides freely in a vertical slot 130 of a guide link 131 that is disposed above the lever 116 with the lower end of the link pivotally engaged with a stud 132 on the shank of the lever. A contractile spring 133 between the studs 129 and 132 provides an operating connection between the two levers. When the control lever 125 is actuated to depress its terminal 127, the rear end of the lever rises and, through the spring connector 133, correspondingly rocks the lever 116 upwardly to lift the head 117 so that its lower arm keeper slot rises clear of the lower stud 52 of the disc 50. At the same time the keeper slot 134 in the upper arm of the head fully engages over the upper stud 52. The parts are thus conditioned so that when the operating member 25 moves rearwardly its driving connection with the lever 116 imparts a clockwise movement to the disc 50. This clockwise movement of the disc 50, acting in the manner already described through the split discs, simultaneously shifts the register pinions to move the pinions of the upper register into engagement with the top bars of their racks and at the same time to move the pinions of the lower register downwardly into engagement with the bottom bars of their racks. In this position of the parts, movement of the racks travelling rearwardly rotates the register pinions oppositely to the direction of their rotation when engaged with the add bars of their racks, so that a subtract operation is effected. In this operation the entire tens transfer operates as a "borrow" action in the same manner as a "carry" action in the operation of addition.

At times it is desirable to employ one register for an interval of operation, such as total taking from one register while action of the other is temporarily suspended. In such case, means not forming a part of this disclosure is employed to hold a set of pinions in one register from shifting while the other is shifting. This action is made possible by the flexibility of the coupling comprising the assembly of the large disc 50 and the smaller split discs. By way of illustration, let it be supposed that the pinions of the lower register were to be held against shifting during the shift of the upper register pinions into engagement with their racks. In such case the counterclockwise rotation of the disc 50 under the drive of the lever 116 would elevate the rearward stud 53 to lift the upper disc section 54. This lifting of the section 54 would correspondingly pull the spring 56 tending to urge the lower section 54a upwardly. However, as the lower register pinions would be held against shifting, the pins 48 would not be permitted to rise and the spring 56 would continue to expand to accommodate the movement of the upper disc section, so that the pinions of the upper register would be shifted into rack engagement without imparting any shifting movement to the pinions of the lower register. In like manner, but in reverse movement, if the upper register pinions were held against shifting, the flexibility of the coupling, acting through the springs 56, would permit a shift of the lower register pinions without effecting shifting movement of the upper set. Further by way of example, let it be supposed that it is desired to shift both sets of register pinions upwardly into engagement with the top bars of their racks. In such case the upper register pinions would be restrained against moving down into engagement with the bottom bars of their racks while at the same time the pinions in the lower register would be shifted upwardly to engage the top bars of their racks by the operating connections previously described. Either simultaneously with upward shift of the lower register pinions, or at a later stage, the pinions of the upper register could be moved upwardly by any appropriate means into engagement with the top bars of their racks. In so moving, the spring 56 connecting the split disc sections 55 and 55a would further expand to accommodate the upward movement of the pinions of the upper register. In this action the rod 45 would be the driving factor lifting the upper disc section 55 for a further expansion of its spring 56 which would already have been somewhat expanded by the counterclockwise downward movement of the stud 53 acting to depress the lower disc section 55a. In like manner, but in reverse movement, the same operation could be effected for shifting the register pinions oppositely to the movement just described. An important concept to be grasped at this time is the extremely wide range of possible combinations of register shifting permitted by the high flexibility of the coupling comprising the disc assembly. This is due to the springs 56 in conjunction with the split discs and provides a coupling having any desired yielding characteristic whereby various combinations of register shifting can be effected. As a further example illustrating one such combination, if in taking a subtotal it is desired to subtract the amount subtotaled in one register from the accumulated amount in the other register, the flexibility of the disc assembly would permit both sets of register pinions to be engaged simultaneously in both lower bars of the racks or in both upper bars of the racks.

Figure 18:
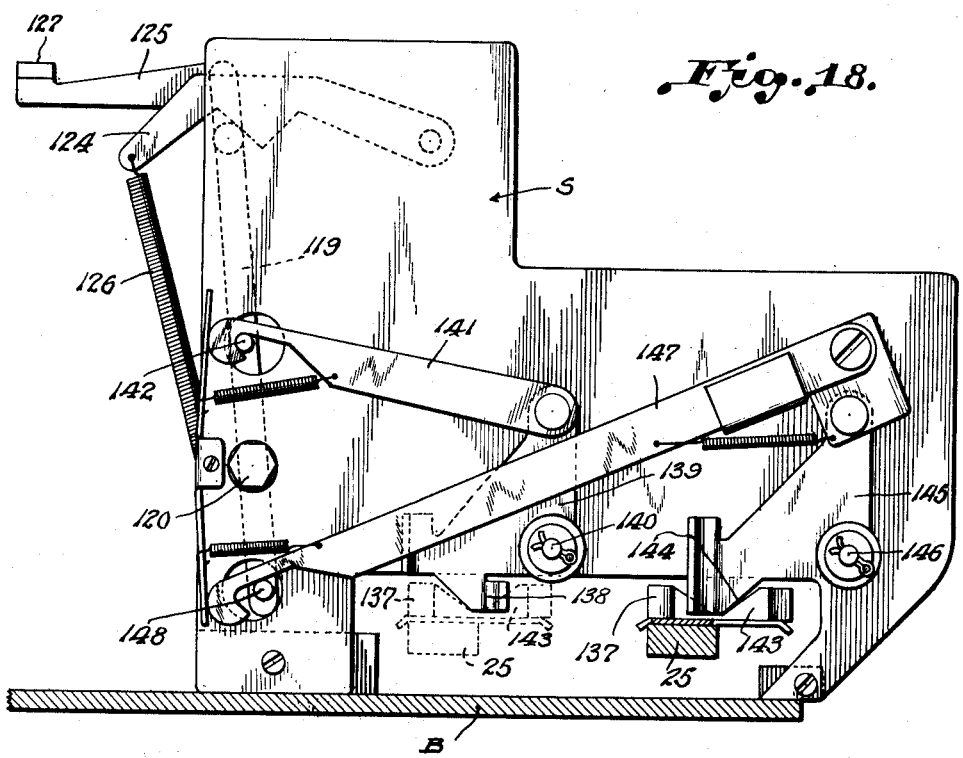
Fig. 18 is an elevation of details of the driving connection between the operating member and the register shift means.
Figures 17, 19:
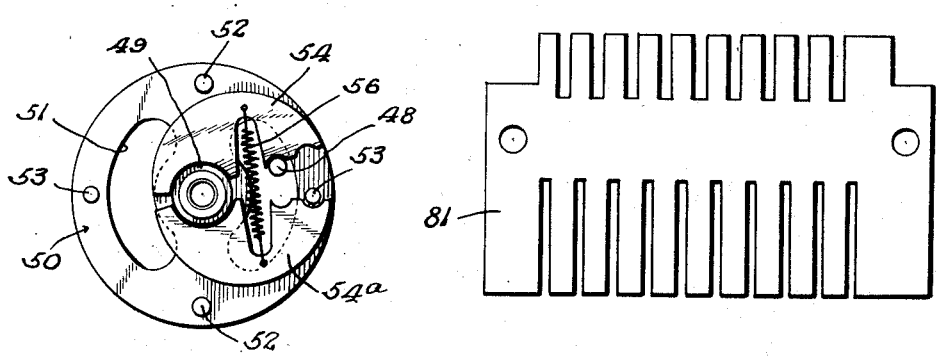
Fig. 17 is an elevation of the disc assembly of Figs. 13 and 14, illustrating one of the split discs shifted relative to the large disc.
Fig. 19 is a plan view of a guide comb element.

Fig. 18 illustrates an embodiment of the driving connection between the operating member 25 and the assembly comprising the rocker post 119 and the lever 116. This connection includes a cam element 137 secured to the operating member 25 for cooperation with an ear 138 carried by a vertically disposed bell crank lever 139 that is pivoted as at 140 to the support member S for oscillation in a vertical plane. As the operating member 25 moves rearwardly from its dotted line position of Fig. 18, the cam 137 rocks the bell crank lever 139 rearwardly and correspondingly exerts a rearward pull on a throw link 141 that is pivoted at its rear end to the bell crank lever and which at its forward end has hooked engagement over a lateral stud 142 carried by the rocker post 119. The rearward pull of the link 141 correspondingly rocks the post 119 rearwardly to shift the lever 116 for effecting a shifting of the register pinions in the manner previously described. A second cam element 143 on the operating member 25 similarly cooperates with an ear 144 on a second bell crank lever 145 that is pivoted as at 146 to the support element S. Forward movement of the operating member, acting through the cam 143, rocks the bell crank lever 145 rearwardly to exert a corresponding pull on a throw link 147 that is pivoted at its rear end to the bell crank lever and which has at its forward end a hooked connection with a lateral stud 148 carried by the rocker post 119 below its fulcrum point. The rearward pull of the link 147 operates to rock the post 119 forwardly to effect a forward shift of the lever 116 for movement of the register pinions out of rack engagement and into neutral position.

*Operation*

Prior to an operation of the calculating unit, following a total operation, the horizontally reciprocable operating member 25 is at rest in the rearmost limit position of its travel, and the parts are disposed as shown in Figs. 1, 2, 5, 10, 13, 14 and 15, with the type bars 20 fully lowered out of printing position and with the pinions of both registers in neutral position and latched by the bars 65 against casual rotation. At this stage all the slides 31 and their racks 75 are in rearmost position, with the rear ends of the racks held against the vertical short edges 85 of their rests 82, and with all rests latched against pivotal movement by the levers 86. Also, when in this position, the heads 74 of the slides are engaged against the rear lugs 78 of their racks with the springs 79 under tension urging the racks to move rearwardly beyond the point at which they are held by the rack rests. As the register pinions are in rack disengaged neutral position, their transfer interponents 92 are urged forwardly by their springs 98 and the stops 94 are held against the stop plates 81'. In this position the tooth 95 on each interponent arm 93 is so located that it determines and constitutes the zero stop point for the register pinion lugs 91 when the pinions are meshed with the racks for rotation in forward movement of the racks, as in total taking. This zero stop position of the transfer interponents is maintained at all times by the bias of the springs 98 except when the interponents are bodily shifted by the camming action of the register pinion lugs in effecting a transfer.

When the slides 31 move forward under the pull of their spring connector 36 moving with the operating member 25 in the first half of its cycle, their T-heads 74 engage the forward rack lugs 78 and the racks are correspondingly advanced to the point at which they are stopped by any control instrumentality which determines the extent of their advance and, consequently, the printing position of their paired type bars. At the conclusion of a printing operation the operating member starts back through the second half of its cycle. Before the racks begin their back stroke the connection 116 (Fig. 10) given movement by the operating member effects a shift of the register pinions simultaneously in both sets and the pinions are meshed with the add bars of their respective racks. Prior to the instant of meshing, the relative positions of each rack, its transfer interponent, and its register pinion are substantially as shown in Fig. 5. Each pinion is at zero with reference to its rack.

During the back stroke of the racks the register pinion of each rack advanced beyond its zero position is additively rotated. When the degree of such rotation necessitates a transfer from any rack to the next higher order rack, a lug 91 on the transferring pinion cams the tooth 95 of its associated interponent and shifts the interponent rearwardly against the bias of its individual spring 98. This action immediately trips the latch lever holding the rocker rest of the next higher order rack. The rocker immediately pivots as previously described, see Figs. 7 and 8, so that when the racks come to a stop against their rests the next higher order rack will have moved the distance of one rack tooth rearwardly beyond the normal rack rest position, adding one digit in the rack of higher order. Unless a total is to be taken, the connection 116 from the operating member shifts the register pinions to move out of rack mesh and into neutral position when beginning the forward stroke of the cycle. While in neutral position the pinions are held by the spring biased latch bars 65 against improper rotation. As the operating member nears the end of its forward travel the link 103, Fig. 10, actuates the reset mechanism in the manner previously described and the rests are restored to their initial positions as in Fig. 3 by action of shafts 107. On the return stroke of the cycle operation the shaft 107 moves forward from the rests 82 as shown in Fig. 2.

When the operating member is next cycled the sides and racks go forward as before, to stop positions newly arranged as a result of new items entered into the machine. The register pinions remain disengaged from the racks and in the additive positions to which they are rotated in the preceding register actuation. Just before the back stroke of the racks begins the register pinions are again shifted into mesh with the add bars of their racks, and as the racks move back the newly entered items are added into the registers and transfers are effected as before. If a total is to be taken, a blank stroke of cycling operation permits resetting of racks and rests without any transfer action taking place in the return stroke. Then, on the following cycle, only one set of the register pinions are held in mesh during the forward stroke of their racks and the racks then are stopped at the points at which the reversely rotated pinion lugs 91 abut the stop teeth 95 on the arms of the transfer interponents. The position of the racks when thus stopped determines the printing position of their corresponding type bars.

An important concept to be grasped in an understanding of this invention is that of parallelism in the relation and operation of the parts. All the actuator slides, racks, transfer interponents, rack rests and their latch levers occupy paralleled planes and move in parallel to the path of movement of a driven operating member that reciprocates horizontally in the main frame of the machine. This arrangement practically eliminates camming friction of moving contacts and thereby materially increases speed of operation. An equally important concept is that of independent motoring of racks moving the further one tooth distance to receive a transfer. The rack springs 79, being constantly under tension when all racks are at their common rear travel limit as determined by the short edges 85 of the rests, are motors which become effective to impart the further movement the instant that a rest begins its rocking action; and this rocking action is speeded by the tension of springs 79 pulling racks 75 against edge 85 of the rack rests to rock the rests and position their edges 84 to limit the rack movement. A transfer across the full set of racks has the rapidity of a chain reaction, because the instant that each register pinion is rotating transferringly it touches off the spring motor drive of the next order rack and pinion and a fresh impetus is imparted to the moving parts. Thus it can be seen that if a transfer is to be effected across a group of pinions, such as would occur if unit one (1) were to be added to 999,999 accumulated previously in the pinions, while the pinion of lowest denomination is being turned one tooth its interponent 92 is being moved against the edge of latch 86 and is releasing the rest of the next higher order so that it can be rocked simultaneously with the further movement of its corresponding rack under its motor spring 79, and simultaneously is releasing the latch of the higher order following for similar repeated simultaneous action in the following higher orders to advance all the pinions, to receive the transfer action.

The advantage in this arrangement is that the movement of the rack receiving the transfer begins with the movement of the rack rest, instead of following the movement of the rest after it has reached position to permit the rack to move to its one tooth advance position. Thus the advancing rack also may release the trip lever of still higher order quickly for further transfer when the conditions of the pinions are such that transfer should take place.

I claim:

1. In a calculating machine embodying a tens transfer mechanism, the combination of a movable rack rest having two stop positions, means biasing the rest to one stop position, a latch urged to hold said rest in its other stop position, an interponent movable from a fixed stop position against and with the latch to move said latch out of holding position, and means for returning the interponent to its fixed stop position independently of movement of the latch, and means operative after the interponent is returned to restore the rest to its latch held position.

2. In a calculating machine, a set of racks, a set of pinions corresponding thereto and adapted for rotating thereby, a rest for each rack and movable between two stop positions in the first of which the racks are limited in movement to position of non-transfer and in the second of which the racks are limited to movement to receive tens transfer, latch means biased to hold said rests in said first position, a transfer interponent for each rack and movable bodily from a fixed stop position to release said latch means, means biasing each interponent to return to its fixed stop position immediately following latch release, a zero point lug on each pinion, a tooth on each interponent engageable by the lug on the pinion of its corresponding rack for moving the interponent against its bias from its fixed stop position and for arresting reverse rotation of the pinion when the interponent is in fixed stop position, reset means for restoring unlatched rests and their racks to first stop position, and reset means operative to return racks from position to receive tens transfer independently of the rest reset means and while the rests are in their unlatched second position.

3. A calculating machine rack rest comprising a movable member having a pair of rack engageable faces at different linear distances relative to the axis of rack travel, and means for moving said member to position either face for rack engagement.

4. In a calculating machine, a set of racks in denominational order, a pinion adjacent each for rotation thereby, a pivoted rest aligned with each rack and having rack engageable stop portions at different radial distances from its fulcrum, individual latches normally holding all said rests with the same portion presented in stop relation to their racks, means biasing said racks to move beyond their point of normal rest engagement an interponent mounted adjacent each rack for independent movement between normal and operated position for tens transfer, means on each pinion to engage and bodily move the next higher order interponent to operated position when the pinion is rotated transferringly for engagement therewith, and means on each interponent for releasing the latch of the next higher order rack rest upon said movement of the interponent, said latch release enabling the rack rest to pivot under the biasing force of its rack and thereby present a different portion thereof in stop relation to the rack and means constantly urging the interponent to return independent of the latch when disengaged from the pinion means.

5. In a transfer mechanism including racks mounted for reciprocal movement and limited in shifting movement in one direction to normal non-transfer position and to position for effecting transfer, pinions rotatable thereby when in operative engagement, stop members mounted for independent shifting movement between normal position and position for conditioning to permit movement of the adjacent rack to transfer position, means responsive to engagement between said stop member with said pinions for operating said stop member to establish transfer conditions, and means constantly urging said stop member independently to return to normal position notwithstanding retention of transfer conditions and upon disengagement with the pinion.

6. In a calculating machine transfer mechanism, a set of racks mounted for reciprocal movement and shiftable in one direction to non-transfer and to transfer positions of adjustment, an individual rest for each rack adapted normally to stop movement of the rack at non-transfer position but adjustable to permit movement of the rack to transfer position, spring means constantly urging the rack to move to transfer position, latching means for holding the rest in position for limiting movement of the rack to non-transfer position, spring means constantly urging the rest partially to shift toward position for limiting movement of the rack to transfer position when said latching means is rendered ineffective in advance of movement of the rack to normal non-transfer position to prevent the latching means from becoming effective prior to movement of the rack to tens transfer position.

7. In a calculating machine having register pinions with lugs thereon and reciprocal pinion actuating racks adapted for limited shifting movement in one direction to position of non-transfer and to position for receiving tens transfer, a stop member shiftable between positions for limiting movement of the rack to non-transfer and to position for limiting movement of the rack to tens transfer, latching means for holding the stop in position to limit movement of the rack to non-transfer position, an element shiftable between normal and operated position and adapted when in normal position to be displaced to operated position by a lug on the pinion during rotational movement thereof in transferring direction, an operative connection between said latching means and said element to render said latching means ineffective responsive to movement of said element to operated position, and means constantly urging return of said element to normal position of adjustment independently of the latching and stop member whereby return thereof is effected substantially immediately after the latching means is rendered ineffective and the lugs become disengaged from said element.

8. In a calculating machine having register pinions with lugs thereon and reciprocal pinion actuating racks adapted for limited shifting movement in one of its directions to position of non-transfer and to position for receiving tens transfer, a stop member shiftable between positions for limiting movement of the rack to non-transfer and to position for limiting movement of the rack to tens transfer, latching means for holding the stop in position to limit movement of the rack to non-transfer position, an element shiftable between normal and operated position and adapted when in normal position to be displaced to operated position by a lug on the pinion during rotational movement thereof in transferring direction, an operative connection between said latching means and said element to render said latching means ineffective responsive to movement of said element to operated position, means constantly urging return of said element to normal position of adjustment independently of the latching and stop member whereby return thereof is effected substantially immediately after the latching means is rendered ineffective and the lugs become disengaged from said element, and means constantly urging said stop in the direction for limiting movement of the rack to transfer position.

9. In a calculating machine having register pinions with lugs thereon and reciprocal pinion actuating racks adapted for limited shifting movement in one direction to position of non-transfer and to position for receiving tens transfer, a stop member shiftable between positions for limiting movement of the rack to non-transfer and to position for limiting movement of the rack to tens transfer, latching means for holding the stop in position to limit movement of the rack to non-transfer position, an element shiftable between normal and operated position and adapted when in normal position to be displaced to operated position by a lug on the pinion during rotational movement thereof in transferring direction, an operative connection between said latching means and said element to render said latching means ineffective responsive to movement of said element to operated position, means constantly urging return of said element to normal position of adjustment independently of the latching and stop member whereby return thereof is effected substantially immediately after the latching means is rendered ineffective and the lugs become disengaged from said element, and separate means for resetting the stop and latch mechanism to position for limiting movement of the rack to non-transfer position responsive to movement of machine parts during a normal cycle of operation.

10. In a calculating machine having register pinions with lugs thereon and reciprocal pinion actuating racks adapted for limited shifting movement in one direction to position of non-transfer and to position for receiving ten transfer, a stop member shiftable between positions for limiting movement of the rack to non-transfer and to position for limiting movement of the rack to tens transfer, latching means for holding the stop in position to limit movement of the rack to non-transfer position, an element shiftable between normal and operated position and adapted when in normal position to be displaced to operated position by a lug on the pinion during rotational movement thereof in transferring direction, an operative connection between said latching means and said element to render said latching means ineffective responsive to movement of said element to operated position, means constantly urging return of said element to normal position of adjustment independently of the latching and stop member whereby return thereof is effected substantially immediately after the latching means is rendered ineffective and the lugs become disengaged from said element, and separate means for actuating the rack to non-transfer position after the pinion has been disengaged therefrom and before reset of the stop and latching means.

CHARLES A. PARKER.

References Cited in the file of this patent
UNITED STATES PATENTS

| Number | Name | Date |
|---|---|---|
| 1,879,245 | Hogfers | Sept. 27, 1932 |
| 1,901,153 | Dunker | Mar. 14, 1933 |
| 1,903,179 | Greve | Mar. 28, 1933 |
| 1,934,747 | Sundstrand | Nov. 14, 1933 |
| 2,178,272 | Vigborg | Oct. 31, 1939 |
| 2,212,639 | Garbell | Aug. 27, 1940 |
| 2,307,105 | Brand | Jan. 5, 1943 |
| 2,308,940 | Sundstrand | Jan. 19, 1943 |
| 2,361,714 | Sundstrand | Oct. 31, 1944 |
| 2,557,585 | Wockenfuss | June 19, 1951 |